INVENTOR.
SHIGEKAZU TAKEDA

United States Patent Office 3,597,292
Patented Aug. 3, 1971

3,597,292
PROCESS FOR EFFECTING A BOND BETWEEN SYNTHETIC FIBER FABRICS AND AN APPARATUS THEREFOR
Shigekazu Takeda, Tokyo, Japan, assignor of a fractional part interest to Iwao Niwa, Kanagawa-ken, Japan
Filed June 28, 1967, Ser. No. 649,556
Claims priority, application Japan, July 4, 1966, 41/43,431; Sept. 8, 1966, 41/59,594
Int. Cl. B29d 23/10
U.S. Cl. 156—203
6 Claims

ABSTRACT OF THE DISCLOSURE

A process for binding the opposing brim portions of a thermoplastic resin fiber fabric to make the fabric into a cylindrical one which will subsequently be used mainly for the preparation of bags therefrom, or the brim portions of two or more of the fabrics to make a single larger fabric of the original ones, characterized in that the bonding is effected by using as a binder the same resin in a molten state as the fabric and the assembly is immediately cooled, while pressing the brim positions together. The apparatus comprises feed means for the molten binder, cooling means and means for pressing the brim portions together.

---

Figure 1:
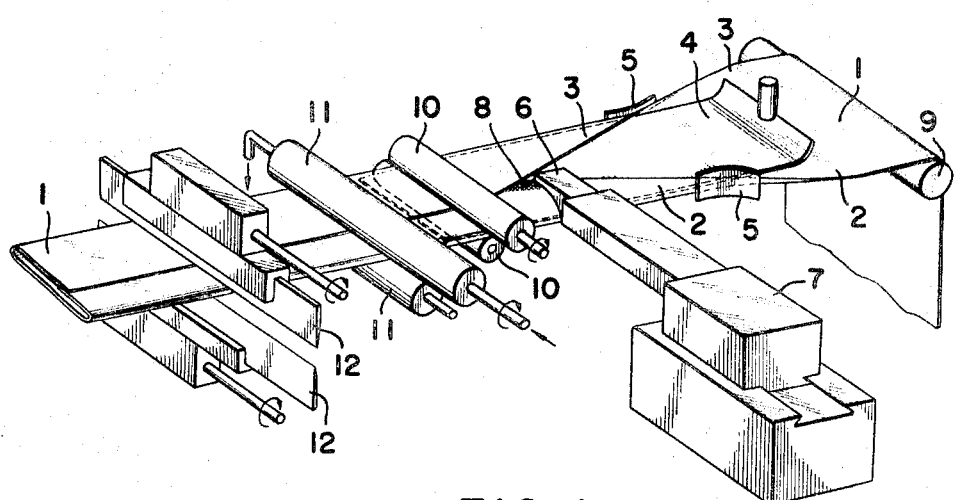

There has heretofore been no chemical binder available for satisfactorily effecting a bond between materials such as fabrics (cloths) or films made of synthetic resin, e.g., polyethylene, polypropylene or the like; and there has therefore been conventionally used a method by which thermoplastic resin fiber fabrics are, per se, thermally welded or heat sealed without the use of any chemical binder or welding agent, to prepare bags or the like from the fabrics.

The bags so obtained have been satisfactory for use as containers for light duty purposes, for example, for holding light goods therein. On the other hand, if thermoplastic resin bags having a voluminal size enough to hold 50 kg. of chemical fertilizer such as particulate ammonium sulphate are prepared using said conventional method, loaded with 50 kg. of the fertilizer through its opening and entirely closed by heat sealing the opening also using the method, and then subjected to a free drop test (the bags are allowed to drop at an altitude of 1.5 m. above the concrete floor), they will be broken at the heat-sealed portions and/or their adjacent portions. This is because the sealed portions and/or their neighborhoods subjected to the heat during the heat-sealing operation are made thinner than the remaining portions not subjected to that heat. And therefore, the former portions become of less strength than the latter. Thus, the bags prepared from thermoplastic resin cloth using the conventional heat-sealing method are generally unsuitable for and, in many cases, cannot be used for the heavy duty purpose as mentioned above.

It has now been found that even thermoplastic resin bags for heavy duty purposes can easily be manufactured from thermoplastic resin cloth using as a binder the same resin as the cloth.

This invention relates to a novel process for effecting a bond between polyalkylene fiber fabrics, the bond being substantially unbreakable without demaging the fabrics. More particularly it relates to a process for effecting such an unbreakable bond between fiber fabrics of thermoplastic resin such as polyethylene, polypropylene or the like by applying, as a binder, the same resin in a molten state as the fabrics to the selected portions thereof to be bonded, slightly pressing against each other the portions with the still molten resin therebetween to effect a preliminary bond, and then additionally pressing and simultaneously cooling the preliminarily bonded portions to complete the bonding.

It is an object of this invention to provide a process for effecting an unbreakable bond between thermoplastic resin bodies, such as polyethylene or polypropylene fiber fabrics, with a binding agent which is a thermoplastic resin of the same kind as the bodies to be bonded, which process is extremely useful for binding together the opposing brim portions of usch a fabric as above to form it into a tubular fabric which can subsequently be used to prepare therefrom bags for heavy duty purposes.

It is another object of this invention to provide an apparatus for effecting said unbreakable bond.

It is still another object of this invention to provide tubular or cylindrical thermoplastic resin fiber fabrics which are, per se, useful for some specific purposes and from which excellent bags for heavy duty uses can easily be manufactured by further using the process of this invention in combination with those described in the copending Japanese applications (Patent applications Nos. 43,432/1966 and 59,595/1966, and Utility Model applications Nos. 064462/1966 and 084966/1966).

Other objects and advantages will become apparent from the following description and drawing.

Figure 2:
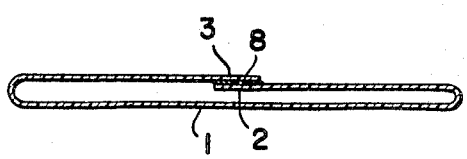

FIG. 1 diagrammatically shows a bonding apparatus and a thermoplastic resin fiber fabric which is being welded, at its opposing brim portions, into a cylinder on the bonding apparatus; and FIG. 2 is a diagrammatic cross-sectional view of the cylinder only to show the structure of the welded portions thereof.

According to one aspect of this invention, a polyethylene, polypropylene or the like fiber fabric is welded so that it may be formed into a cylinder by folding one of the opposing brim portions of the fabric just over the other while placing, as a binder, the same resin in a molten state as the fabric in a gap between the almost overlapped brim portions to be welded, slightly pressing against each other the overlapping portions with the still softened binder therebetween to effect a preliminary bond between the portions, and then additionally pressing the preliminarily bonded portions against each other simultaneously with cooling the portions including the binder therebetween whereby the bond is completed.

More particularly the thermoplastic resin fiber fabric can be made into a cylindrical form on the bonding apparatus of this invention by folding one of the opposite brim portions of the fabric just over the other so that they are somewhat overlapped with each other while applying a resin of the same kind as the fabric and molten at a temperature of about 240–290° C., preferably 250–275 C., to the brim portion sides which are opposite ot each other and to be bonded by means of an applicator attached to the bonding apparatus in such a manner that the molten resin applied may form its band-like layer between the portions as the fabric moves on the apparatus longitudinally along the axis thereof, slightly pressing the portions against each other to preliminarily melt join the lower side of the layer with the upper side of the lower brim portion simultaneously with melt joining the upper side of the layer with the lower side of the upper brim portion, and then passing the thus-obtained cylindrical fabric with the preliminarily joined portions through between a cooling device to thereby applying additional pressure to and simultaneously cool the preliminarily joined portions for the completion of the joining. When the fabric used in the process of this invention is an endless one, the fabric cylinder obtained will of course be an endless one which may be cut into suitably long cylinders for use in the preparation of bags therefrom further using the joining technique according to this invention.

Referring now to FIG. 1, numeral indicates an endless thermoplastic resin fiber fabric such as a polyethylene fiber cloth. The fabric 1 is passed over a guide roll 9 through under a nozzle 6 towards a rotary cutter 12. The brim portions 2 and 3 of the fabric 1 are initially turned up and then gradually folded one upon another (the brim portion 3 is folded on the brim portion 2 in this case) by means of a width adjusting plate 4 and folding guide plates 5. As a binder, molten resin which is materially the same as the fabric is applied at about 240–290° C. to the opposite sides of the almost overlapped brim portions 2 and 3 through the nozzle 6 of a flow-adjustable applicator 7. Then the fabric with the molten resin 8 between its overlapped brim portions 2 and 3 is passed through between pressing rolls 10, when a preliminary bond is effected among the portion 2, portion 3 and resin binder therebetween by pressure contacting the three with one another by means of the roll 10. The thus-obtained cylindrically formed fabric is further advanced through between cooling rolls 11 to press additionally and cool the preliminarily bonded portions for the completion of the bonding. A coolant used for the cooling rolls can be water, and if desired in hot climates, brine cooled by a refrigerator may be used for the same purpose. The endless fabric cylinder is moved forward on the bonding apparatus and then cut by the rotary cutter 12 into suitably long cylinders which are mainly intended to be used in the preparation of bags for heavy duty purposes. The pressing rolls 10 and cooling rolls 11 may additionally be used as feeding rolls by which the fabric is fed.

In FIG. 1, there is shown only one pair of cooling rolls, and, however, two or more pairs of cooling rolls should be used if the feeding rate of the fabric is desired to be higher. On the bonding machine, the endless fabric cylinder formed can finally be cut into cylinders of any axial length desired with the rotary cutter 12 by adjusting the rotation pitches thereof. The thus-cut cylinders can each be formed into a bag, particularly a heavy-duty bag by treating (cutting, bonding and the like) one of the open ends of the cylinder in such manners as described in said copending Japanese patent and utility model applications.

A fabric normally used in the process of this invention is one which is manufactured from polyethylene or polypropylene flat yarns (stretched tapes) by interweaving them untwilled (plain), or is one which is prepared by laminating a polyethylene or polypropylene film to the plain fabric as mentioned above.

The inventor's experiences have shown that a bag prepared from such a film coated fiber fabric as above by applying the bonding technique of this invention to the fabric can be used as a satisfactory container for holding up to about 50 kilograms of a powdery or granular substance such as chemical fertilizer even if the substance is hygroscopic, that a bag prepared from a fabric which is the same as the above except that it has no film coated thereon can be used as a satisfactory container for holding about the same amount (in weight) of such a powdery or granular substance as mentioned above only when the substance is non-hygroscopic, and that a bag prepared from polyethylene or polypropylene film (not fabric) in the same bonding manner as above can only be used as a container for holding therein not more than about half the amount of either of the above substances.

For the purpose of tests for the toughness of bags, 50 kilograms of a granular material (chemical fertilizer) were put in each of the bags (some prepared from a fabric without film coating thereon and others from a film coated fabric by applying the bonding technique of this invention to the fabric), and then the bag loaded with the material through its opening was entirely closed by sealing the opening according to this invention and subjected to a drop test (dropped at an altitude of 1.5 m. above the concrete floor); the results of the tests showed that any of the bags loaded with the granular material was not broken and still remained unchanged in appearance after the test.

In order to make sure the most remarkable advantage in that an improvement is made in tensile strength of the portions bonded according to this invention, the following tests were made using two groups of test samples, one group consisting of the samples prepared by binding together two pieces from polyethylene film coated polyethylene fiber fabric at their brim portions according to this invention and the other by sewing up two other pieces from the same fabric at their brim portions by means of a sewing machine.

The results of the tests showed that the brim portions bound together according to this invention are increased in tensile strength by approximately 35 percent, compared with those sewn up by the sewing machine according to the conventional method.

Though the bonding process of this invention has so far been explained about its use in effecting a bond between polyalkylene fiber fabrics, it is to be understood that this process can also be applied to effecting a bond between the polyalkylene substances in any form, for example, between a tape and a fabric to reinforce the former in strength.

This invention will be better understood by the following examples.

EXAMPLE 1

Polyethylene fiber fabrics or cloths (88 g./m.$^2$) used in this example consisted of 1,000-denier polyethylene tapes or flat yarns (0.960 g./cc., 5.01 g./d., elongation 18.04%, melt index 3.0) interwoven untwilled (plain) and they had a warp density of 10 yarns/inch and weft density of 10 yarns/inch. And polyethylene resin used as a binder in this example had a density of 0.921 g./cc. and melt of 4.0 (g./10 min.).

According to this invention, each of the polyethylene fiber fabrics was fed to a bonding apparatus of this invention at a certain feeding rate to make a fabric cylinder of it by folding one of its opposite brim portion just over the other so that they are somewhat overlapped each other while applying the polyethylene resin binder in a molten state to the opposite sides of the portions to be bonded, slightly pressing against each other the portions with the still molten binder therebetween and then cooling and additionally pressing them against each other to complete the bonding. The operational conditions employed in this example were as follows:

Feeding rate of fabric: 50 m./min.
Temperature of molten binder through nozzle: 265° C.
Width of overlapped portions: 40 mm.
Width of binder layer formed between overlapped portions: 15 mm.
Amount of binder applied: 1.8 g./m.
Final pressure exerted on binder-applied portions: 6.0 kg./cm.$^2$
Cooling temperature: 18.5° C.

The polyethylene composing the fabric was the product (trade name: Shorex, Grade #6,000 F.) made by the Showa Denko K. K. and that used as a binder the product (trade name: Yukalon LK–30) by the Mitsubishi Petrochemical Co., Ltd.

For comparison purpose, each of the rest of the polyethylene fiber fabrics was made into a cylindrical form by folding one of the brim portions just over the other so that they are suitably overlapped each other, placing a polyethylene tape on each of the outer sides of the overlapped portions to reinforce the seam to be formed by the subsequent sewing and then sewing the portions and tapes together by the use of a sewing machine (SD4 type made by the New Long Co.) under the following condition:

Stitching pitch: 8 mm.
Sewing threads: vinylon (polyvinyl alcohol) 20/2 x 3

For comparison, the original fiber fabrics, the portions bonded of the fabric cylinder according to this invention and the portions sewn up of the fabric cylinder by the conventional method were sampled and tested for their tensile tenacity in a direction parallel to that in which the warps or wefts run, perpendicular to the line formed by the bonding, and perpendicular to the line formed by the sewing, respectively, using an Instron type tensile strength tester under the following conditions:

Rate at which sample stretched: 30 cm./min.
Effective length, of sample, to which tension applied: 200 mm.
Width of sample: 50 mm.
Temperature and humidity at which test was made: 20° C. and 65% R.H.

The results obtained from the tests are shown in Table 1.

TABLE 1
[Tensile tenacity (kg./50 mm.)]

| Sample Number: | Original fiber fabric | Portions | |
|---|---|---|---|
| | | Bonded | Sewn up |
| 1 | 48 | 22 | 7 |
| 2 | 48 | 24 | 7 |
| 3 | 44 | 28 | 8 |
| 4 | 46 | 28 | 7 |
| 5 | 44 | 26 | 8 |
| Mean value | 46 | 26 | 7 |

EXAMPLE 2

The procedure of Example 1 was followed in this example except that the fabric used had 105 g./m.² in weight, 12 yarns/inch in warp density and 12 yarns/inch in weft density, the feeding rate of fabric was 40 m./min., the width of binder layer formed was 17 mm. and the amount of binder applied was 2.0 g./m.

The tensile tenacities determined are shown in Table 2.

TABLE 2
[Tensile tenacity (kg./50 mm.)]

| Sample Number: | Original fiber fabric | Portions | |
|---|---|---|---|
| | | Bonded | Sewn up |
| 1 | 54 | 34 | 15 |
| 2 | 52 | 30 | 12 |
| 3 | 54 | 30 | 13 |
| 4 | 50 | 32 | 11 |
| 5 | 52 | 30 | 13 |
| Mean value | 52 | 32 | 13 |

EXAMPLE 3

The procedure of Example 1 was repeated except that the fabric had a weight of 140 g./m.², a warp density of 16 yarns/inch and a weft density of 16 yarns/inch, the feeding rate of the fabric was 40 m./min., the width of binder layer formed 18 mm. and the amount of binder applied 2.2 g./m.

The tensile tenacities are indicated in Table 3.

TABLE 3
[Tensile tenacity (kg./50 mm.)]

| Sample Number: | Original fiber fabric | Portions | |
|---|---|---|---|
| | | Bonded | Sewn up |
| 1 | 70 | 52 | 19 |
| 2 | 66 | 42 | 21 |
| 3 | 66 | 48 | 21 |
| 4 | 48 | 46 | 18 |
| 5 | 64 | 48 | 20 |
| Mean value | 66 | 48 | 20 |

EXAMPLE 4

The procedure of Example 1 was followed except that the fabric was a 0.05 mm. thick polyethylene film-laminated polyethylene cloth, it had a weight of 124 g./m.², a warp density of 9 yarns/inch and a weft density of 9 yarn/inch, the feeding rate was 60 m./min., the temperature of molten binder 255° C., the width of binder layer formed on the fabric was 17 mm. and the amount of g./m.

The film (Yukalon, Grade #800 made by the Mitsubishi Petrochemical Co., Ltd.) was such that it was thermally laminated on one of the sides of the fabric.

The tensile tenacities determined using said tensile strength tester are shown in Table 4.

TABLE 4
[Tensile tenacity (kg./50 mm.)]

| Sample Number: | Original fiber fabric | Portions | |
|---|---|---|---|
| | | Bonded | Sewn up |
| 1 | 57.6 | 38.8 | 28.6 |
| 2 | 60.3 | 37.7 | 28.3 |
| 3 | 58.5 | 37.4 | 27.8 |
| 4 | 57.8 | 39.2 | 28.5 |
| 5 | 58.9 | 38.5 | 28.1 |
| Mean value | 58.6 | 38.3 | 28.2 |

EXAMPLE 5

The procedure of Example 1 was repeated except that the fabric was one laminated with a 0.06 mm. thick polyethylene film on one of the sides of the fabric, it had a weight of 130 g./m.², the temperature of molten binder applied was 260° C., the width of binder layer formed on the fabric was 17 mm. and the amount of binder applied to the fabric was 1.9 g./m. And the feeding rate of fabric was 60 m./min.

The tensile tenacities measured are listed in Table 5.

TABLE 5
[Tensile tenacity (kg./50 mm.)]

| Sample No.: | Original fiber fabric | Portions | |
|---|---|---|---|
| | | Bonded | Sewn up |
| 1 | 64.7 | 43.5 | 29.7 |
| 2 | 65.2 | 40.7 | 31.3 |
| 3 | 63.8 | 41.2 | 32.8 |
| 4 | 63.6 | 40.8 | 30.1 |
| 5 | 64.4 | 41.3 | 29.3 |
| Mean value | 64.3 | 41.5 | 30.6 |

EXAMPLE 6

The procedure of Example 1 was followed except that the fabric was such that it was thermally laminated with a 0.06 mm. thick polyethylene film, it had a weight of 156 g./m.², a warp density of 12 yarns/inch and a weft density of 12 yarns/inch, the temperature of molten binder applied was 270° C., the width of binder layer 19 mm. and the amount of binder applied 2.4 g./m.

The tensile tenacities obtained are shown in Table 6.

TABLE 6
[Tensile tenacity (kg./50 mm.)]

| Sample Number.: | Original fiber fabric | Portions | |
|---|---|---|---|
| | | Bonded | Sewn up |
| 1 | 68.9 | 43.8 | 33.8 |
| 2 | 69.7 | 44.3 | 32.6 |
| 3 | 69.8 | 43.7 | 33.6 |
| 4 | 70.6 | 44.7 | 31.2 |
| 5 | 70.8 | 43.5 | 34.5 |
| Mean value | 69.9 | 44.0 | 33.1 |

EXAMPLE 7

The procedure of Example 1 was followed except that the fabric was a polypropylene fiber fabric having a weight of 84 g./m.², the feeding rate of fabric was 40 m./min., the temperature of molten binder ejected 255° C., the width of binder layer formed on the fabric 13 mm. and the amount of binder applied to the fabric 1.4 g./m. In addition, the polypropylene used for the fabric was the product (trade name: Mitsubishi Noblen) made by the Mitsubishi Yuka K.K., and that used as the binder was the product (trade name: Mitsubishi Noblen FA-3) made by the same manufacturer as above.

The tensile tenacities determined are enumerated in Table 7.

TABLE 7
[Tensile tenacity (kg./50 mm.)]

| | Original fiber fabric | Portions | |
|---|---|---|---|
| | | Bonded | Sewn up |
| Sample No.: | | | |
| 1 | 42 | 35 | 30 |
| 2 | 40 | 36 | 33 |
| 3 | 43 | 34 | 29 |
| 4 | 39 | 35 | 31 |
| 5 | 44 | 33 | 30 |
| Mean value | 42 | 35 | 31 |

EXAMPLE 8

The same procedure as in Example 1 was taken in this example except that the fabric used was a polypropylene fiber fabric (136 g./m.$^2$), the temperature of molten binder used 260° C., the width of binder layer formed on the fabric 18 mm. and the amount of binder applied to the fabric 1.6 g./m.

The fabric used was made of polypropylene (trade name: Chisso Polypro) manufactured by the Chisso Sekiyu Kageku K.K., and the resin used as the binder was polypropylene (trade name: Mitsubishi Noblen FA-3) made by the Mitsubishi Yuka K.K.

The tensile tenacities determined are shown in Table 8.

TABLE 8
[Tensile tenacity (kg./50 mm.)]

| | Original fiber fabric | Portions | |
|---|---|---|---|
| | | Bonded | Sewn up |
| Sample No.: | | | |
| 1 | 39 | 34 | 31 |
| 2 | 38 | 36 | 30 |
| 3 | 40 | 37 | 29 |
| 4 | 42 | 35 | 28 |
| 5 | 40 | 37 | 30 |
| Mean value | 40 | 36 | 30 |

EXAMPLE 9

The procedure of Example 1 was followed in this example except that the plain fabric was made of polypropylene (trade name: Chisso Polypro), it had a weight of 132 g./m.$^2$, a warp density of 14 yarns/inch and a weft density of 14 yarns/inch, the feeding rate of the fabric was 40 m./sec., the temperature of molten binder 270° C., the width of binder layer formed on the fabric 18 mm. and the amount of binder applied to the fabric 2.0 g./m. The resin used as the binder was polypropylene (trade name: Mitsubishi Nobulen FA-3) made by the Mitsubishi Yuka K.K.

The tensile tenacities determined using said tester for tensile strength are shown in Table 9.

TABLE 9
[Tensile strength (kg./50 mm.)]

| | Original fiber fabric | Portions | |
|---|---|---|---|
| | | Bonded | Sewn up |
| Sample No.: | | | |
| 1 | 42 | 35 | 30 |
| 2 | 40 | 36 | 33 |
| 3 | 43 | 34 | 29 |
| 4 | 39 | 35 | 31 |
| 5 | 44 | 33 | 30 |
| Mean value | 42 | 35 | 31 |

What is claimed is:

1. A process for forming a cylinder having a tensile strength of at least 22 kg./50 mm. from a thermoplastic resin fiber fabric prepared from stretched fibers of polyethylene or polypropylene of a weight between 84 and 156 g./m.$^2$ which comprises folding one of the opposite brim portions of the fabric just over the other for a predetermined length so that they overlap, placing, as a binder, the same resin as the fabric in a molten state at a temperature between 240° and 290° on one of the overlapping brim portions to be bonded in amount between 1.4 and 2.4 g./m., pressing against each other the overlapped portions with the still molten binder therebetween to effect a preliminary bond between said portions, and then additionally pressing the preliminarily bonded portions against each other with a pressure of 6 kg./cm.$^2$ while simultaneously cooling to 18° C., said portions including the binder therebetween, whereby the bond is completed and cutting the thus-formed fabric cylinder into smaller cylinders of preselected length.

2. The process according to claim 1 wherein said fabric is additionally laminated with a polyyethylene or polypropylene film.

3. The process according to claim 1 wherein the polyethylene fiber fabric has a weight of 88 gm./m.$^2$, the polyethylene resin used as a binder has a density of 0.921 gm./cc., and the amount of the binder applied is 1.8 gm./m.

4. The process according to claim 1 wherein the said polyethylene fabric has a weight of 105 gm./m.$^2$ and the amount of binder applied is 2 gm./m.

5. The process according to claim 1 wherein said polyethylene fabric has a weight of 140 gm./m.$^2$ and the amount of binder applied is 2.2 gm./m.

6. The process according to claim 1, wherein the binder is applied at a temperature between 250° and 275° C.

References Cited

UNITED STATES PATENTS

| 2,169,936 | 8/1939 | Wagner | 156—218X |
| 2,587,422 | 2/1952 | Wills | 156—466X |
| 2,773,773 | 12/1956 | Harder et al. | 156—203X |
| 2,914,108 | 11/1959 | Coakley | 156—466X |

SAMUEL W. ENGLE, Primary Examiner

U.S. Cl. X.R.

156—218, 466